(12) United States Patent
Medina et al.

(10) Patent No.: US 8,699,351 B2
(45) Date of Patent: Apr. 15, 2014

(54) METHOD AND SYSTEM FOR DETECTING AUDIO AND VIDEO SYNCHRONIZATION

(75) Inventors: Douglas R. Medina, Grain Valley, MO (US); Frank Robert Coppa, Kansas City, MO (US); Larry Kennedy, Lawrence, KS (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 456 days.

(21) Appl. No.: 12/631,512

(22) Filed: Dec. 4, 2009

(65) Prior Publication Data

US 2011/0134763 A1 Jun. 9, 2011

(51) Int. Cl.
*H04L 12/26* (2006.01)
(52) U.S. Cl.
CPC ................... *H04L 12/2634* (2013.01)
USPC .......................................................... 370/241
(58) Field of Classification Search
CPC ............ H04L 12/2634; H04L 12/2657; H04L 12/266
USPC ......... 370/241–248, 250–253, 464, 465, 498, 370/503, 509, 516–521; 709/248
See application file for complete search history.

(56) References Cited

U.S. PATENT DOCUMENTS

| | | | |
|---|---|---|---|
| 5,872,588 A | 2/1999 | Aras et al. | |
| 6,414,960 B1 * | 7/2002 | Kuhn et al. | 370/395.64 |
| 6,477,181 B1 | 11/2002 | Fujimori et al. | |
| 7,269,137 B2 | 9/2007 | Bizet et al. | |
| 7,333,513 B2 | 2/2008 | Sala et al. | |
| 7,400,653 B2 * | 7/2008 | Davies et al. | 370/493 |
| 7,545,794 B2 | 6/2009 | Loukianov | |
| 7,593,061 B2 * | 9/2009 | Baumgartner | 348/515 |
| 7,614,066 B2 | 11/2009 | Urdang et al. | |
| 7,680,153 B2 * | 3/2010 | Ma | 370/503 |
| 7,693,182 B2 | 4/2010 | Sala et al. | |
| 7,693,190 B2 * | 4/2010 | Firestone et al. | 370/503 |
| 7,711,244 B2 * | 5/2010 | Sato et al. | 386/201 |
| 7,755,526 B2 | 7/2010 | Medina et al. | |
| 7,764,713 B2 * | 7/2010 | Abraham et al. | 370/510 |
| 7,873,727 B2 * | 1/2011 | Pal et al. | 709/224 |
| 7,936,695 B2 * | 5/2011 | Oran | 370/252 |
| 8,027,560 B2 * | 9/2011 | Brady et al. | 386/203 |
| 2002/0013948 A1 | 1/2002 | Aguayo, Jr. et al. | |
| 2003/0033394 A1 | 2/2003 | Stine | |
| 2003/0066094 A1 * | 4/2003 | van der Schaar et al. | 725/151 |
| 2003/0079230 A1 | 4/2003 | Woodward, Jr. | |
| 2003/0189922 A1 | 10/2003 | Howe | |
| 2005/0135526 A1 | 6/2005 | Miller et al. | |
| 2005/0219366 A1 * | 10/2005 | Hollowbush et al. | 348/193 |
| 2008/0117937 A1 | 5/2008 | Firestone et al. | |
| 2009/0128708 A1 | 5/2009 | Huffman et al. | |
| 2009/0144791 A1 | 6/2009 | Huffman et al. | |
| 2009/0172200 A1 * | 7/2009 | Morrison et al. | 709/248 |
| 2009/0197652 A1 | 8/2009 | Lundstrom et al. | |

(Continued)

*Primary Examiner* — Dmitry H Levitan
(74) *Attorney, Agent, or Firm* — Jackson Walker L.L.P.

(57) ABSTRACT

A method and system for diagnosing synchronization offsets in IPTV program signals includes generating audio counter values for audio packets and video counter values for video packets, such that synchronized audio packets and video packets have corresponding counter values. The correspondence may be fixed or may be a variable relationship during the IPTV program duration. The difference in arrival times of the audio and video packets may be measured at various IPTV network nodes, and compared to the IPTV program clock. Aberrant values for arrival times may result in a network synchronization alarm at an identified IPTV network node.

15 Claims, 8 Drawing Sheets

(56) References Cited

U.S. PATENT DOCUMENTS

| | | |
|---|---|---|
| 2009/0276224 A1 | 11/2009 | Medina et al. |
| 2010/0017835 A1 | 1/2010 | Wilson et al. |
| 2010/0030642 A1 | 2/2010 | Huffman et al. |
| 2010/0058385 A1 | 3/2010 | Mitchals et al. |
| 2010/0058400 A1 | 3/2010 | Nicas et al. |
| 2010/0058420 A1 | 3/2010 | Medina et al. |
| 2010/0058430 A1 | 3/2010 | Jones et al. |
| 2010/0077440 A1 | 3/2010 | Medina et al. |
| 2010/0109926 A1 | 5/2010 | Medina et al. |
| 2010/0223647 A1 | 9/2010 | Johnston et al. |
| 2010/0239086 A1 | 9/2010 | Johnston et al. |
| 2010/0241258 A1 | 9/2010 | Medina et al. |
| 2010/0303100 A1 | 12/2010 | Niamut et al. |
| 2011/0067058 A1 | 3/2011 | Johnston et al. |
| 2011/0122316 A1 | 5/2011 | Jones et al. |
| 2011/0142417 A1 | 6/2011 | Wilson et al. |

* cited by examiner

METHOD AND SYSTEM FOR DETECTING AUDIO AND VIDEO SYNCHRONIZATION

BACKGROUND

1. Field of the Disclosure

The present disclosure relates to Internet-protocol television (IPTV) and, more particularly, to synchronization of audio streams and video streams in IPTV programs.

2. Description of the Related Art

IPTV channels may be transmitted as audio and video streams from a source to a plurality of IPTV users. Synchronization between the audio and video streams may deteriorate at various locations in the IPTV network.

DESCRIPTION OF THE EXEMPLARY EMBODIMENTS

Figure 1:
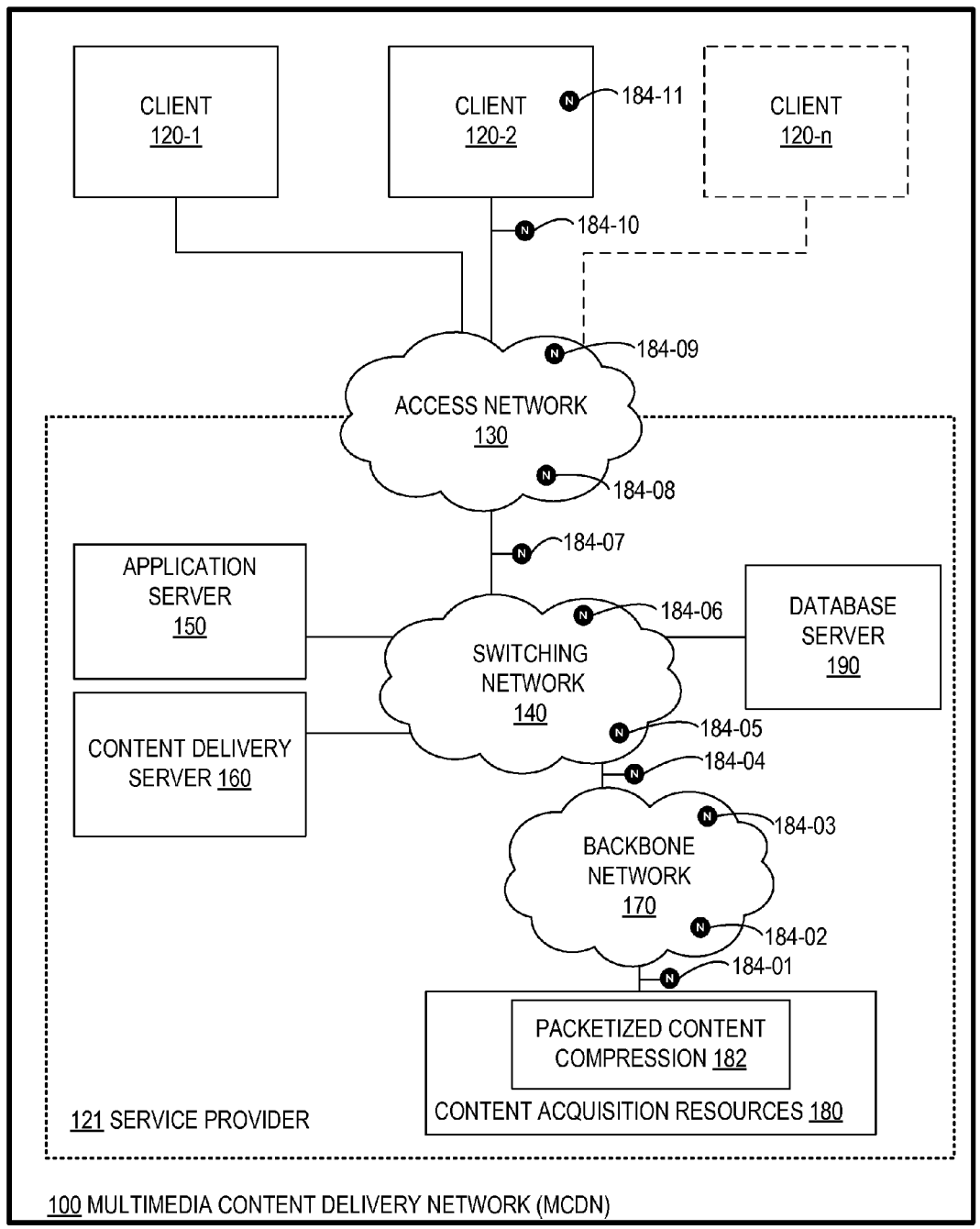
FIG. 1 is a block diagram of selected elements of an embodiment of an IPTV network.

In one aspect, a disclosed method for processing IPTV packets for transmission over an IPTV network includes receiving a television program signal, and packetizing the television program signal into an IPTV program signal comprising an audio packet stream and a video packet stream. An audio counter value may be written to at least one audio packet and a video counter value may be written to at least one video packet. A corresponding audio counter value and video counter value pair may respectively indicate a synchronized audio packet and video packet pair. The method may also include transmitting the packetized IPTV program signal over the IPTV network. The received television program signal may be uncompressed, while the method operation of packetizing may further include digitally compressing the television program signal. The method operation of digitally compressing may include compressing in accordance with an H.264 video compression standard. The method operation of packetizing may encompass including an IPTV program clock value in at least some of the video packets, while the IPTV program clock may be synchronized with the television program signal In specific embodiments, the method may further include recording a first arrival time of an audio packet arriving at an IPTV network node, recording a second arrival time of a video packet arriving at the IPTV network node, and determining a first synchronization offset based on a difference between the first arrival time and the second arrival time. The audio counter value of the audio packet may correspond to the video counter value of the video packet.

In particular embodiments, the method may also include determining a second synchronization offset based on a difference between the first arrival time and an IPTV program clock value, and determining a third synchronization offset based on a difference between the second arrival time and the IPTV program clock value. The IPTV program clock value may be obtained from a video packet. When the absolute value of any one of the first synchronization offset, the second synchronization offset, and the third synchronization offset exceeds a predetermined value, the method may include generating a network synchronization alarm for the IPTV network node. The method may further include determining, for a plurality of IPTV network nodes, synchronization metrics associated with individual IPTV network nodes, including at least one of: the first synchronization offset, the second synchronization offset and the third synchronization offset. The method may still further include analyzing the synchronization metrics to identify individual IPTV network nodes that are the source of aberrant synchronization offset values.

In another aspect, a network testing device for monitoring synchronization of IPTV packets broadcast over an IPTV network may include a processor configured to access memory media. The memory media may include instructions executable by the processor to measure, at an IPTV network node, a respective arrival time for audio packets and video packets associated with an IPTV program broadcast over the IPTV network, and determine correlated audio packet and video packet pairs based on an audio counter value and a video counter value pair obtained from a respective audio packet and video packet in each pair. The memory media may further include processor executable instructions to calculate a first arrival time offset for each correlated audio packet and video packet pair based on a difference between the arrival times for the respective audio packet and video packet in the pair.

In certain embodiments, the memory media may further include processor executable instructions to calculate a second arrival time offset for a video packet, based on a difference between the arrival time for the video packet and an IPTV program clock value, and calculate a third arrival time offset for a audio packet, based on a difference between the arrival time for the audio packet and the IPTV program clock value. When the absolute value of any one of the first arrival time offset, the second arrival time offset, and the third arrival time offset exceeds a predetermined value, the processor executable instructions included in the memory media may be executable to generate a network synchronization alarm for the IPTV network node. The memory media may yet further include processor executable instructions to send, to an IPTV network server, the first arrival time offset, the second arrival time offset, and the third arrival time offset for packets of the IPTV program signal, along with an indication of the IPTV network node.

In yet another aspect, a disclosed computer-readable memory media includes executable instructions for monitoring IPTV programs broadcast over an IPTV network. The instructions may be executable to receive an uncompressed television program signal, and packetize the television program signal into an IPTV program signal comprising an audio packet stream and a video packet stream, including instructions executable to compress the television program signal. Each audio packet may include an audio counter value and each video packet may include a video counter value. The audio counter value may correspond to the video counter value within a respectively synchronized audio/video packet pair. The instructions may further be executable to include an IPTV program clock value in at least some of the video packets, and broadcast the packetized IPTV program signal over the IPTV network. The instructions executable to compress may include instructions executable to compress in accordance with an H.264 video compression standard. The audio counter value may increment for each consecutive audio packet, while the video counter value may increment for each consecutive video packet. The audio counter value may be included in an audio packet header, while the video counter value may be included in a video packet header.

In particular embodiments, the memory media may further include instructions executable to receive, for a plurality of IPTV network nodes, a first synchronization offset and a second synchronization offset of the packetized IPTV program signal. The first synchronization offset may represent a difference between the first arrival time and an IPTV program clock value, while the second synchronization offset may represent a difference between the second arrival time and an IPTV program clock value. For each of the plurality of IPTV network nodes, the instructions included in the memory media may further be executable to record the first synchronization offset and the second synchronization offset, along with an indication of the IPTV program signal. When the absolute value of the difference of the first synchronization offset and the second synchronization offset exceeds a predetermined value for an identified IPTV network node, the instructions included in the memory media may further be executable to generate a network synchronization alarm for the identified IPTV network node. The network synchronization alarm may include an IPTV network diagnostic request for the identified IPTV network node.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of multimedia content delivery network (MCDN) 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs", "television programs", "IPTV programs" or, simply, "programs." It is noted that MCDN 100 may be referred to as an "IPTV network."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an IP-compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscriber line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL-compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber-based network to accommodate high data transfer rates. Backbone network 170 may provide multimedia content over large geographic areas, such as between major population centers, or across an entire national network system. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. As shown in FIG. 1, content acquisition resources 180 includes packetized content compression 182, which, as will be described in detail herein, may generate IPTV program streams including means to detect synchronization of audio and video components in the streams.

Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140 (see also FIG. 8).

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. In certain embodiments, application server 150 may be configured to include various additional software applications (not shown in FIG. 1).

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, and details for network equipment in switching network 140 and/or backbone network 170.

Also shown in FIG. 1 are IPTV network nodes 184, which may represent exemplary locations at which testing for synchronization of audio and video portions of IPTV program streams may be performed. Network testing at IPTV network nodes may be performed by a network testing device (see also FIG. 6). By detecting synchronization offsets between video and audio streams of an IPTV program, a source of synchronization offset may be determined and associated with a particular IPTV network node 184. In FIG. 1, IPTV network nodes 184 are shown at various locations in a distribution path of an IPTV program that is broadcast to a plurality of clients 120. IPTV network node 184-01 may represent a location immediately downstream from content acquisition resources 180, or a super head office (see also FIG. 8). IPTV network nodes 184-02 and 184-03 may respectively represent locations at an ingress and at an egress of backbone network 170. IPTV network node 184-04 may represent a location between backbone network 170 and switching network 140. IPTV network nodes 184-05 and 184-06 may respectively represent locations at an ingress and at an egress of switching network 140. IPTV network node 184-07 may represent a location between switching network 140 and access network 130. IPTV network nodes 184-08 and 184-09 may respectively represent locations at an ingress and at an egress of access network 130. IPTV network node 184-10 may represent a location between switching network 140 and client 120-2. IPTV network node 184-11 may represent a location at client 120-2.

Figure 2:
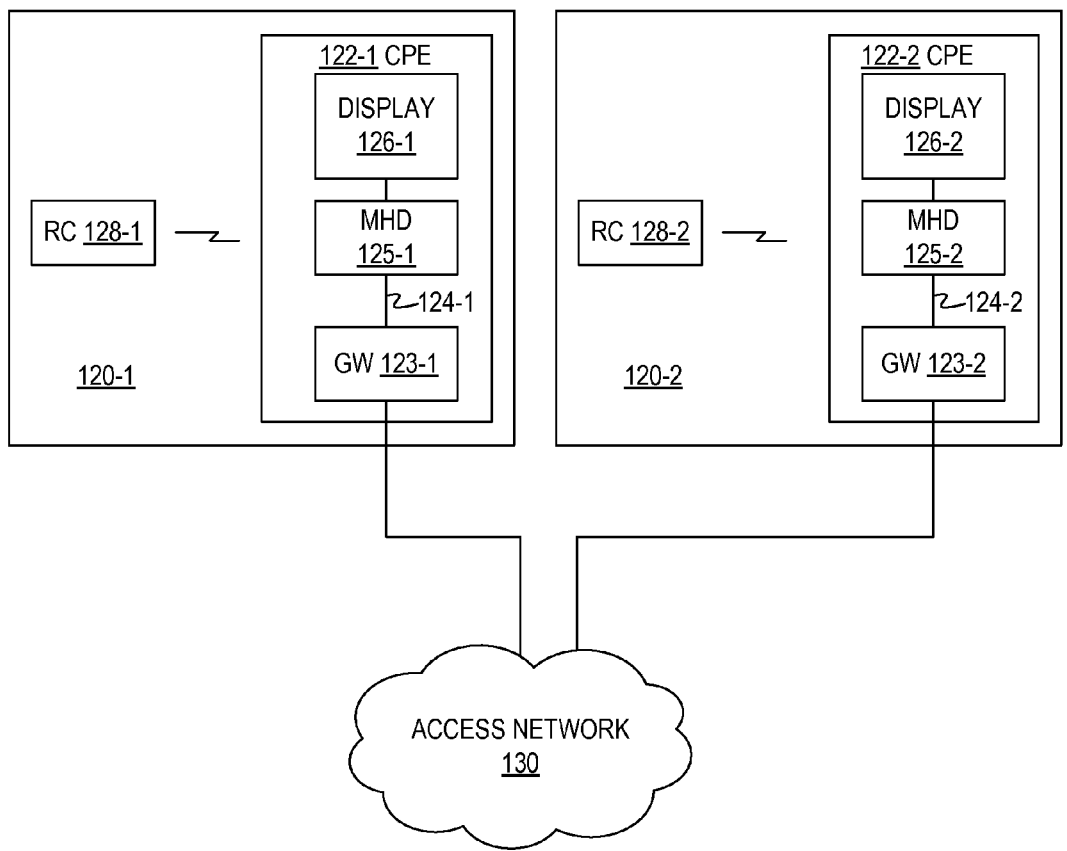
FIG. 2 is a block diagram of selected elements of an embodiment of an IPTV network.

Turning now to FIG. 2, clients 120 are shown in additional detail with respect to access network 130. Clients 120 may include network appliances collectively referred to herein as CPE 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125. In some embodiments, remote control 128 may be used to select programs for viewing using MHD 125 and display 126

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a coaxial or IP-based MCDN.

Figure 3:
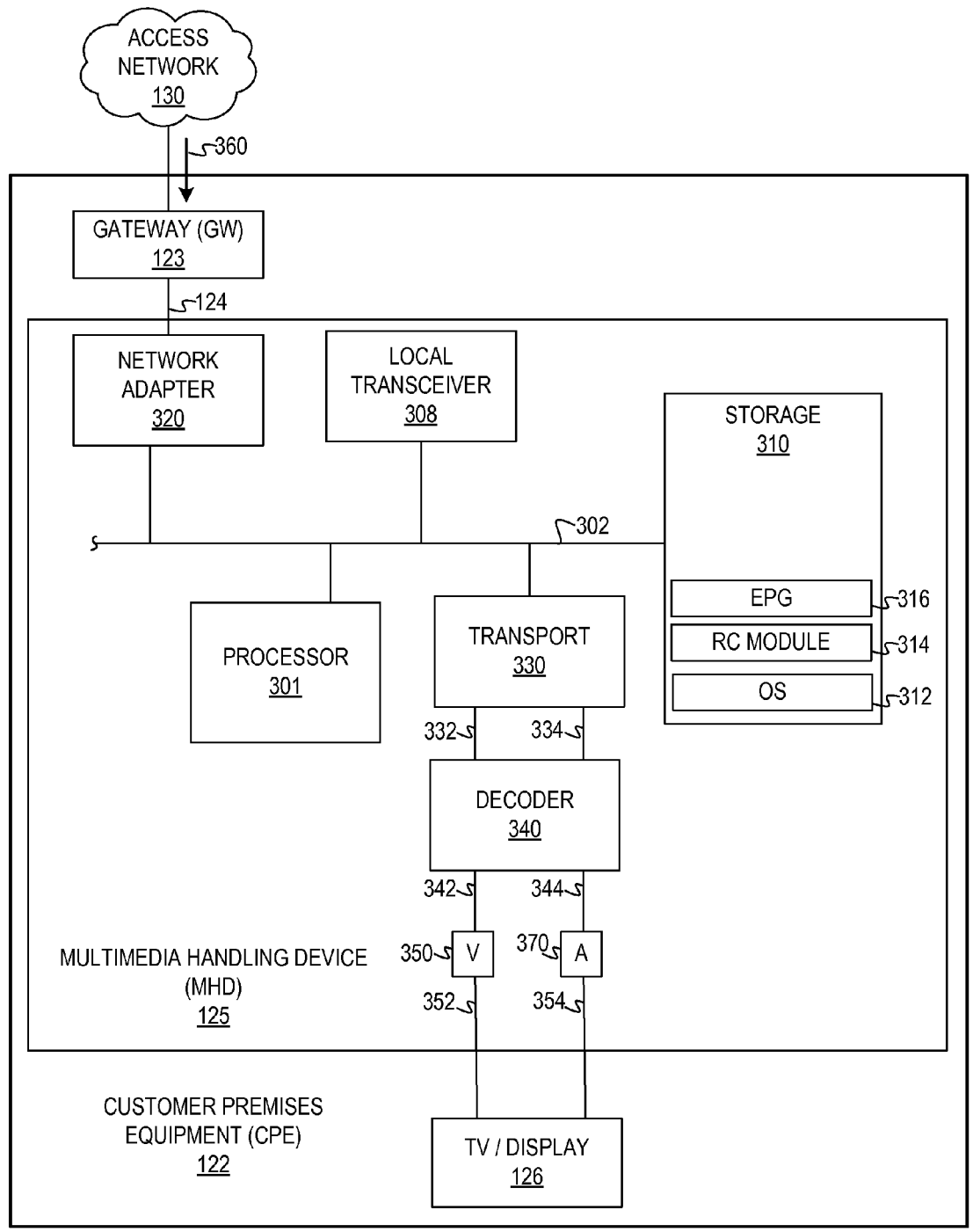
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP-based content delivery networks, MHD 125, as depicted in FIG. 3, may include transport unit 330 that assembles the payloads from a sequence or set of network packets into a stream of multimedia content. In coaxial-based access networks, content may be delivered as a stream that is not packet-based and it may not be necessary in these embodiments to include transport unit 330. In a coaxial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, and EPG 316. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314.

Local transceiver 308 represents an interface of MHD 125 for communicating with external devices, such as remote control 128, or another universal remote control device. Local transceiver 308 may provide a mechanical interface for coupling to an external device, such as a plug, socket, or other proximal adapter. In some cases, local transceiver 308 is a wireless transceiver, configured to send and receive IR or RF or other signals. Local transceiver 308 may be accessed by RC module 314 for providing remote control functionality.

Figure 4:
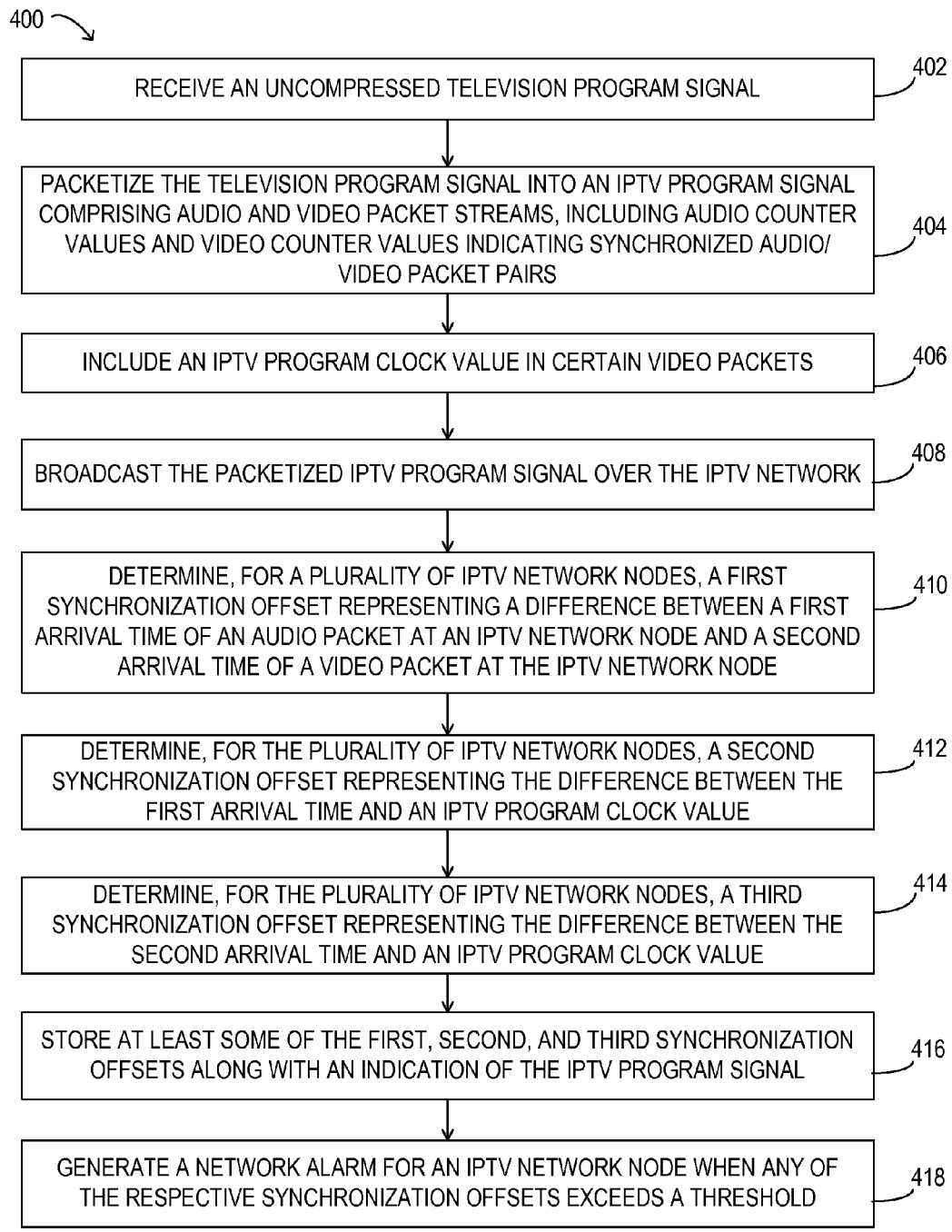
FIG. 4 illustrates an embodiment of a method for detecting synchronization in an IPTV network.

Turning now to FIG. 4, an embodiment of method 400 for detecting audio and video synchronization in IPTV programs is illustrated. In certain embodiments, method 400 may be executed by packetized content compression 182 (see FIG. 1) in conjunction with audio and video packet monitoring 614 (see FIG. 6). It is noted that method 400 may be performed with respect to IPTV network nodes 184 (see FIG. 1) or other IPTV network nodes, as desired. Certain portions of method 400 may be performed at a head office of an IPTV network (see FIG. 8). At least some portions of method 400 may be repeated, or performed in parallel, for a number of IPTV network nodes 184, in order to diagnose performance characteristics across various portions of an IPTV network, which may also result in identification of a particular IPTV network component generating an undesired synchronization offset. It is further noted that certain operations in method 400 may be rearranged or omitted in various embodiments.

In method 400, an uncompressed television program signal may be received (operation 402). The uncompressed television signal may be generated or received at a head office of an IPTV network. The uncompressed television signal may be an analog or a digital signal. The television program signal may be packetized into an IPTV program signal comprising audio and video packet streams, including audio counter values and video counter values indicating synchronized audio/video packet pairs (operation 404). The IPTV program signal may be represented by an audio packet stream and a video packet stream transmitted by the IPTV network. The audio packets may have a fixed or variable payload size. The video packets may also have a fixed or variable payload size. The ratio of the payload of the audio packets to the corresponding video packets may be fixed or variable. Thus, a number of different numbering schemes for the audio counter values and the video counter values may be implemented. In other words, an audio packet synchronized to a respective video packet will have an audio counter value corresponding, in a defined manner, to the video counter value of the respective video packet. Such packets may be considered pairs of audio and video packet. Correspondence between audio counter values and video counter values may be exact or may be some fixed or variable mathematical relationship during the IPTV program duration. In certain cases, a video packet may be associated (i.e., paired) with more than one audio packet. Conversely, an audio packet may be associated with more than one video packet, for example, when the audio packet includes audio data corresponding to a transition in the IPTV program from one video packet to the next. The audio counter value may be written to an audio packet header, while the video counter value may be written to a video packet header. In one embodiment, the audio counter value and the video counter value increment for each consecutive audio packet and video packet, respectively. The counter values may be 16-bit values, in one embodiment.

An IPTV program clock value may be included in certain video packets (operation 406). A video compression standard may indicate that an IPTV program clock value is sent within a given time interval. For example, a value of a 15 MHz program clock may be sent every 500 ms. The IPTV program clock may be synchronized with the uncompressed television signal. The packetized IPTV program signal may be broadcast over the IPTV network (operation 408). In certain embodiments, the IPTV program may be multicast to a number of clients via an access network.

Next, a first synchronization offset, representing a difference between a first arrival time of an audio packet at an IPTV network node and a second arrival time of a video packet at the IPTV network node, may be determined for a plurality of IPTV network nodes (operation 410). A synchronization offset may be determined at an IPTV network node using a network testing device (see FIG. 6). A plurality of network testing devices may be implemented to determine a plurality of synchronization offsets. A second synchronization offset, representing the difference between the first arrival time and an IPTV program clock value, may be determined for the plurality of IPTV network nodes (operation 412). A third synchronization offset, representing the difference between the second arrival time and an IPTV program clock value, may be determined for the plurality of IPTV network nodes (operation 414). At least some of the first, second, and third synchronization offsets may be stored, along with an indication of the IPTV program signal (operation 416). Synchronization offsets may be stored using a network testing device and/or at an IPTV network server. A network testing device may transmit data, such as synchronization offsets and related timestamps, to an IPTV network server. A network alarm for an IPTV network node may be generated when any of the respective synchronization offsets exceeds a threshold (operation 418). The network alarm may result in an IPTV diagnostic request for the identified IPTV network node. The network alarm may result from analysis of synchronization metrics associated with individual IPTV network nodes, including at least one of: the first synchronization offset, the second synchronization offset and the third synchronization offset. The synchronization metrics may be analyzed to identify individual IPTV network nodes that are the source of aberrant synchronization offset values. In this manner, a historical trend of synchronization metrics may be acquired and stored to characterize normal and aberrant behavior of IPTV network nodes.

Figure 5:
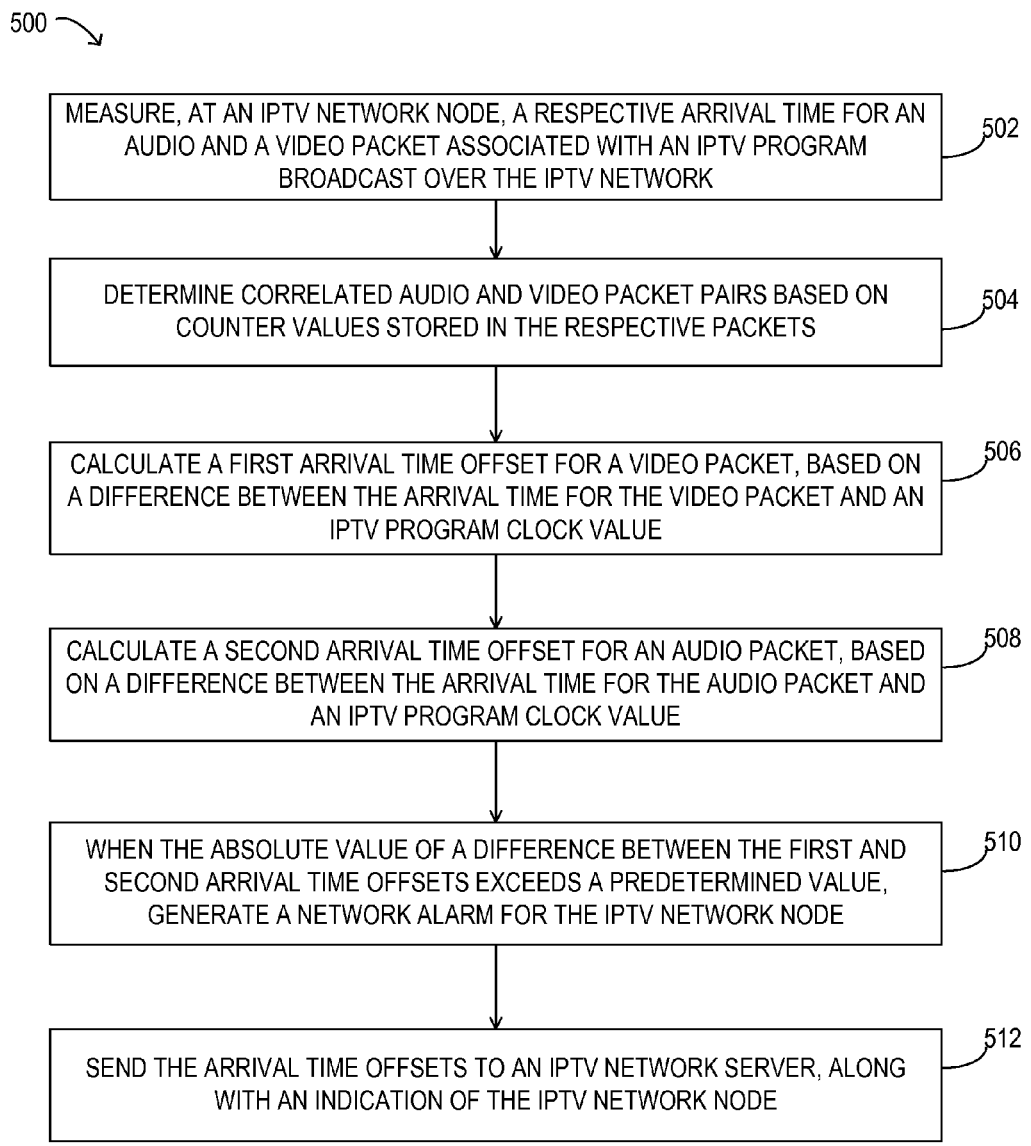
FIG. 5 illustrates an embodiment of a method for detecting synchronization in an IPTV network.

Referring to FIG. 5, an embodiment of method 500 for detecting audio and video synchronization in IPTV programs is illustrated. In certain embodiments, method 500 may be executed by audio and video packet monitoring 614 (see FIG. 6). It is noted that method 500 may be performed with respect to IPTV network nodes 184 (see FIG. 1) or other IPTV network nodes, as desired. Although method 500 is described in terms of a singular IPTV network node, method 500 may be repeated, or performed in parallel, for a number of IPTV network nodes 184, in order to diagnose performance characteristics across various portions of an IPTV network, which may also result in identification of a particular IPTV network component generating an undesired synchronization offset. It is further noted that certain operations in method 500 may be rearranged or omitted in various embodiments.

In method 500, a respective arrival time for an audio and a video packet associated with an IPTV program broadcast over the IPTV network may be measured at an IPTV network node (operation 502). Correlated audio and video packet pairs may be determined based on counter values stored in the respective packets (operation 504). A first arrival time offset, based on a difference between the arrival time for the video packet and an IPTV program clock value, may be calculated (operation 506). A second arrival time offset, based on a difference between the arrival time for the audio packet and an IPTV program clock value, may be calculated (operation 508). When the absolute value of a difference between the first and second arrival time offsets exceeds a predetermined value, a network alarm for the IPTV network node may be generated (operation 510). The arrival time offsets may be sent to an IPTV network server, along with an indication of the IPTV network node (operation 512).

Figure 6:
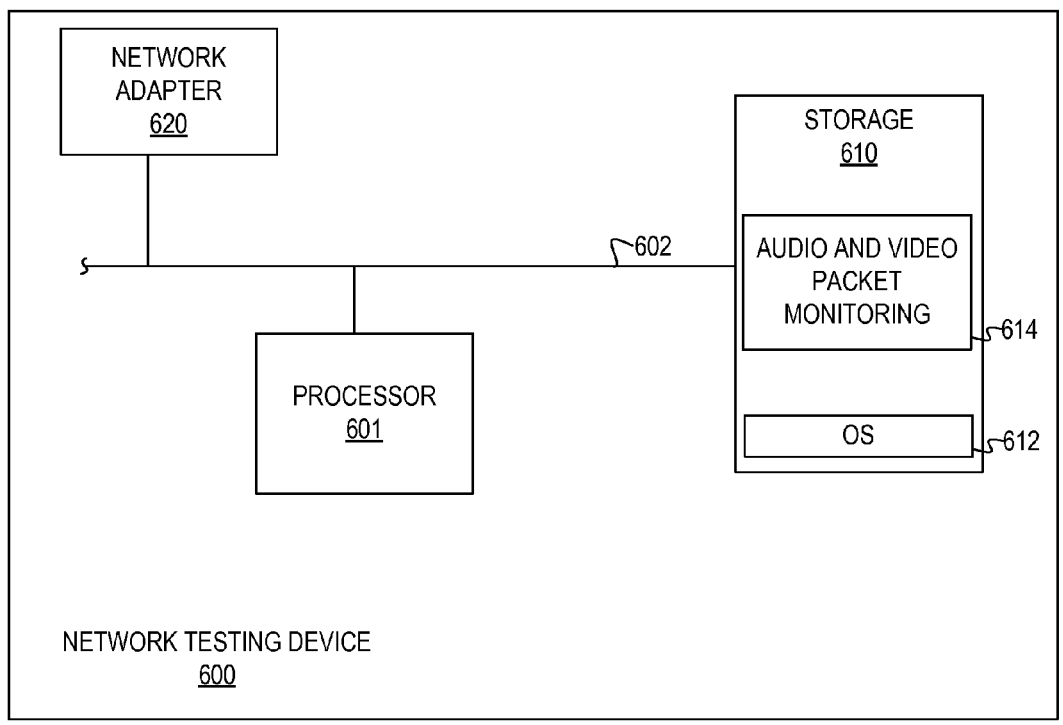
FIG. 6 is a block diagram of selected elements of an embodiment of a network testing device.

Referring now to FIG. 6, a block diagram illustrating selected elements of an embodiment of network testing device 600 is presented. In FIG. 6, network testing device 600 is shown schematically, independent of any physical implementation or packaging. Network testing device 600 may represent a device used at IPTV network node 184 to diagnose synchronization offset.

In the embodiment depicted in FIG. 6, network testing device 600 includes processor 601 coupled via shared bus 602 to storage media collectively identified as storage 610. Network testing device 600, as depicted in FIG. 6, further includes network adapter(s) 620 that may interface, or interconnect a number of network ports. In certain embodiments, network testing device 600 may include functionality for switching logical network connections among a number of network ports, which may be represented by network adapter(s) 620. Accordingly, shared bus 602 may represent a switch fabric or interconnect, suitable for routing and switching a number of network connections simultaneously.

Storage 610 encompasses persistent and volatile media, fixed and removable media, and magnetic and semiconductor media. Storage 610 is operable to store instructions, data, or both. Storage 610 as shown may include sets or sequences of instructions, namely, an operating system 612, and audio and video packet monitoring 614. Storage 610 may store additional data (not shown in FIG. 6) associated with synchronization testing of IPTV programs. Operating system 612 may be a UNIX or UNIX-like operating system, a Windows® family operating system, an embedded operating system, or another suitable operating system. In various embodiments, audio and video packet monitoring 614 represents executable instructions for detecting synchronization offsets between audio and video packets for an IPTV program stream.

Figure 7:
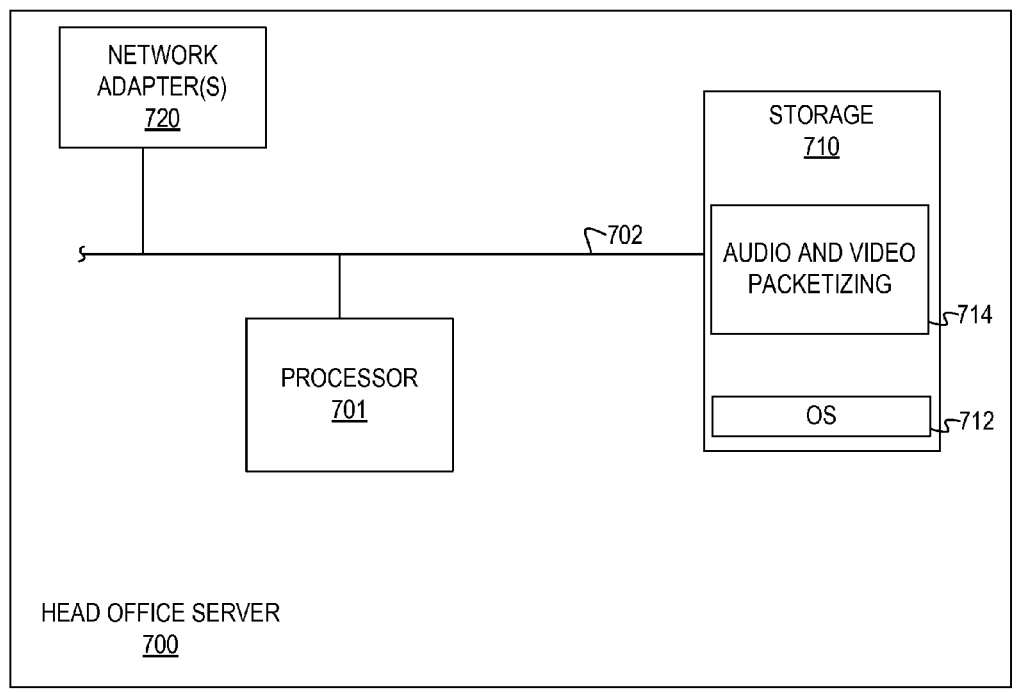
FIG. 7 is a block diagram of selected elements of an embodiment of a head office server.

Turning now to FIG. 7, a block diagram illustrating selected elements of an embodiment of head office server 700 is presented. In FIG. 7, head office server 700 is shown schematically, independent of any physical implementation or packaging. Head office server 700 may represent a computing device used at a head office of an IPTV network, such as MCDN 100 (see FIGS. 1 and 8), for processing and packetizing audio and video portions of an IPTV program.

In the embodiment depicted in FIG. 7, head office server 700 includes processor 701 coupled via shared bus 702 to storage media collectively identified as storage 710. Head office server 700, as depicted in FIG. 7, further includes network adapter(s) 720 that may interface, or interconnect a number of network ports. In certain embodiments, head office server 700 may include functionality for switching logical network connections among a number of network ports, which may be represented by network adapter(s) 720. Accordingly, shared bus 702 may represent a switch fabric or interconnect, suitable for routing and switching a number of network connections simultaneously.

Storage 710 encompasses persistent and volatile media, fixed and removable media, and magnetic and semiconductor media. Storage 710 is operable to store instructions, data, or both. Storage 710 as shown may include sets or sequences of instructions, namely, an operating system 712, and audio and video packetizing 714. Operating system 712 may be a UNIX or UNIX-like operating system, a Windows® family operating system, an embedded operating system, or another suitable operating system. In various embodiments, audio and video packetizing 714 represents executable instructions for packetizing audio and video IPTV program streams. The packetizing performed by audio and video packetizing 714 may include digital compression. In certain embodiments, the digital compression includes compression substantially conforming to a standard for video compression, such as H.264. In certain embodiments, audio and video packetizing 714 may be configured to include an audio counter value in audio packets and a video counter value in video packets, such that synchronized audio and video packet pairs are labeled with respectively corresponding audio counter values and video counter values.

Figure 8:
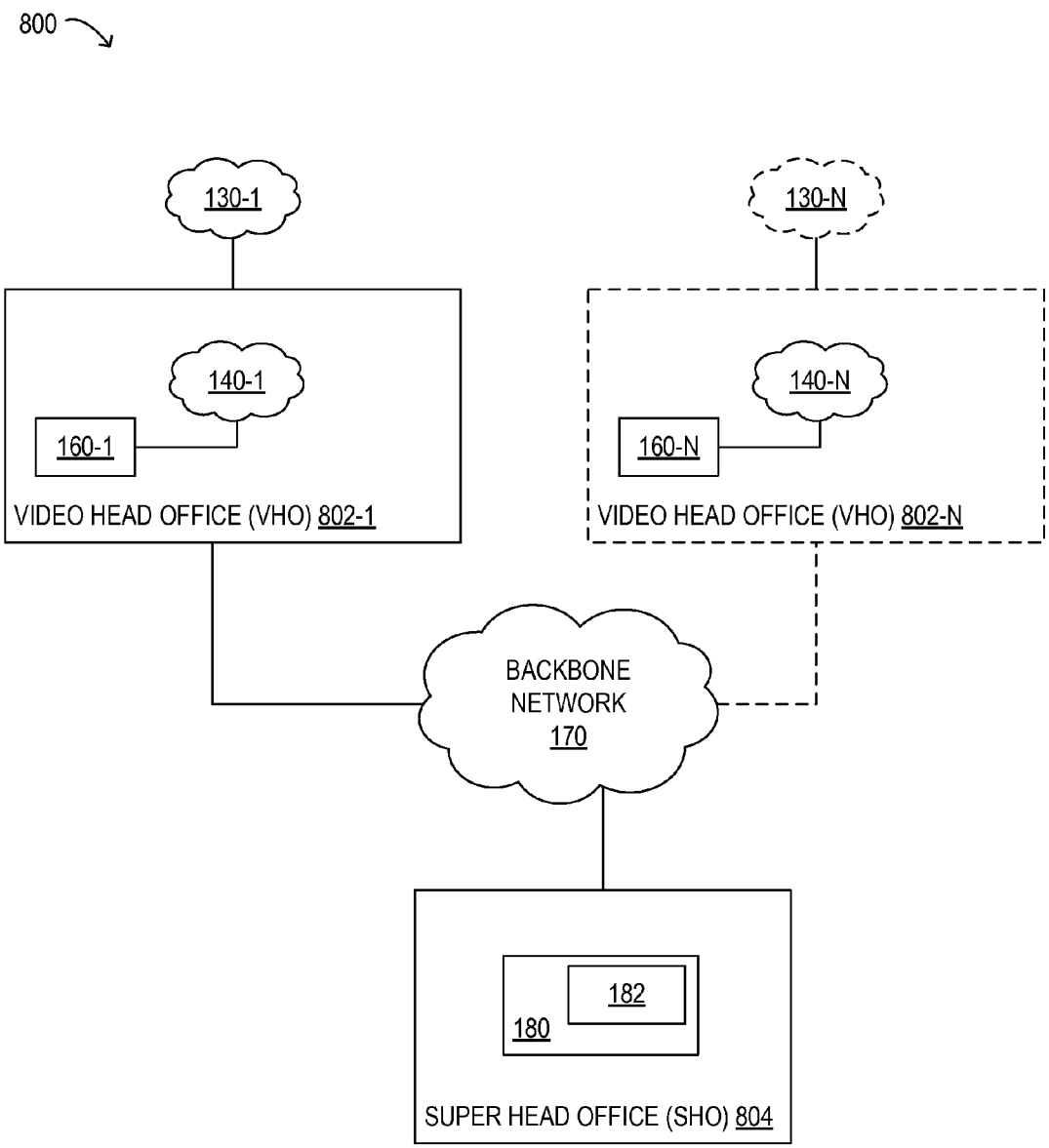
FIG. 8 is a block diagram of selected elements of an embodiment of an IPTV network.

Turning now to FIG. 8, a block diagram illustrating selected elements of an embodiment of IPTV network 800 is presented. IPTV network 800 depicts similar elements as MCDN 100 (see FIG. 1). It is noted that like numbered elements in FIG. 8 represent components discussed above with respect to FIGS. 1-3. IPTV network 800, as described below, illustrates in particular head offices which serve as sources for content, such as television programs, that is packetized and broadcast as IPTV program signals.

In IPTV network 800, super head office (SHO) 804 may represent a central location for obtaining and generating content broadcast throughout IPTV network 800. For example, when IPTV network 800 covers a national market, SHO 804 may be the source for nationally broadcast IPTV programs. As shown in FIG. 8, SHO 804 may include content acquisition resources 180 and packetized content compression 182, as described above (see also FIG. 1). SHO 804 may obtain content from external sources (not shown in FIG. 8) such as satellite feeds, cable networks, television networks, terrestrial broadcast networks, and other sources.

In FIG. 8, SHO 804 may be coupled, through backbone network 170, to a number of video head offices (VHO) 802, which may represent regional media markets for IPTV programs. Thus, VHO 802 may provide localized programming to a certain geographic region. As illustrated in FIG. 8, a number of VHOs 802 may be included in IPTV network 800. VHO 802-1 is shown including content delivery server 160-1 and switching network 140-1, while access network 130-1 represents a network segment reaching clients 120 (not shown in FIG. 8, see FIG. 1). In certain embodiments, VHO 802-1 may further include additional elements, such as application server 150 and database server 190 (not shown in FIG. 8, see FIG. 1). Content delivery server 160-1 may obtain content from external sources (not shown in FIG. 8) such as satellite feeds, cable networks, television networks, terrestrial broadcast networks, and other sources, and may insert additional programs into IPTV programs provided by SHO 804. In various embodiments, an instance of packetized content compression 182 may accordingly be implemented at content delivery server 160-1. VHO 802-1 is shown as an exemplary instance, which may be duplicated up to VHO 802-N for N number of instances covering N respective local regions. VHO 802-N is accordingly shown including content delivery server 160-N, switching network 140-N and is shown coupled to access network 130-N, representing generalized instances.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A packet transmission method, comprising:
   receiving an uncompressed television program signal;
   packetizing the television program signal into an IP television program signal comprising a video packet stream including a video packet and an audio packet stream including an audio packet corresponding to the video packet;
   including a video counter value in the video packet;
   including an audio counter value corresponding to the video counter value in the audio packet;
   including a program clock value, distinct from the video counter value, in the video packet, wherein the program clock value is associated with a program clock synchronized with the IP television program signal;
   transmitting the packetized IP television program signal over an IP television network;
   recording a first arrival time of the audio packet arriving at an IP television network node;
   recording a second arrival time of the video packet arriving at the IP television network node;
   determining a first synchronization offset based on a difference between the first arrival time and the second arrival time;
   obtaining the program clock value from the video packet;
   determining a second synchronization offset based on a difference between the first arrival time and the program clock value;
   determining a third synchronization offset based on a difference between the second arrival time and the program clock value;
   maintaining, for each of a plurality of network nodes, historical values of the first synchronization offset, the second synchronization offset, and the third synchronization offset; and
   determining from the historical values, individual network nodes producing offset values exceeding predetermined thresholds.

2. The method of claim 1, wherein the IP program television signal is digitally compressed.

3. The method of claim 1, wherein including the program clock value in the video packet comprises periodically determining a value of the program clock and periodically including the program clock value in a video packet.

4. The method of claim 1, further comprising:
   when the absolute value of any one of the first synchronization offset, the second synchronization offset, and the third synchronization offset exceeds a predetermined value, generating a network synchronization alarm for the IP television network node.

5. The method of claim 1, further comprising:
   determining the audio counter value based on the video counter value and a ratio of video packets to audio packets in the IP television program signal.

6. A network testing device, comprising:
a processor; and
a non-transitory computer readable storage medium including processor executable instructions that, when executed by the processor, cause the processor to perform operations comprising:
receiving an uncompressed television program signal;
packetizing the television program signal into an IP television program signal comprising a video packet stream including a video packet and an audio packet stream including an audio packet corresponding to the video packet;
including a video counter value in the video packet;
including an audio counter value corresponding to the video counter value in the audio packet;
including a program clock value, distinct from the video counter value, in the video packet, wherein the program clock value is associated with a program clock synchronized with the IP television program signal;
transmitting the packetized IP television program signal over an IP television network;
recording a first arrival time of the audio packet arriving at an IP television network node;
recording a second arrival time of the packet arriving at the IP television network node;
determining a first synchronization offset based on a difference between the first arrival time and the second arrival time;
obtaining the program clock value from the video packet;
determining a second synchronization offset based on a difference between the first arrival time and the program clock value;
determining a third synchronization offset based on a difference between the second arrival time and the program clock value;
maintaining, for each of a plurality of network nodes, historical values of the first synchronization offset, the second synchronization offset, and the third synchronization offset; and
determining from the historical values, individual network nodes producing an offset value exceeding a predetermined threshold.

7. The network testing device of claim 6, wherein the operations include:
when the absolute value of any one of the first arrival time synchronization offset, the second arrival time synchronization offset, and the third arrival time synchronization offset exceeds the predetermined threshold, generating a network synchronization alarm for the IP television network node.

8. The network testing device of claim 7, wherein the operations include:
sending, to an IP television network server, the first arrival time synchronization offset, the second arrival time synchronization offset, and the third arrival time synchronization offset for packets of the IP television program signal, along with an indication of the IP television network node.

9. A non-transitory computer-readable storage medium, including processor executable instructions that, when executed by a processor, cause the processor to perform operations comprising:
receiving an uncompressed television program signal;
packetizing the television program signal into an IP television program signal comprising a video packet stream including a video packet and an audio packet stream including an audio packet corresponding to the video packet;
including a video counter value in the video packet;
including an audio counter value corresponding to the video counter value in the audio packet;
including a program clock value, distinct from the video counter value, in the video packet, wherein the program clock value is associated with a program clock synchronized with the IP television program signal;
transmitting the packetized IP television program signal over an IP television network;
recording a first arrival time of the audio packet arriving at an IP television network node;
recording a second arrival time of the packet arriving at the IP television network node;
determining a first synchronization offset based on a difference between the first arrival time and the second arrival time;
obtaining the program clock value from the video packet;
determining a second synchronization offset based on a difference between the first arrival time and the program clock value;
determining a third synchronization offset based on a difference between the second arrival time and the program clock value;
maintaining, for each of a plurality of network nodes, historical values of the first synchronization offset, the second synchronization offset, and the third synchronization offset; and
determining from the historical values, individual network nodes producing an offset value exceeding a predetermined threshold.

10. The non-transitory computer readable storage media of claim 9, wherein the operations include:
compressing the television program signal in accordance with an H.264 video compression standard.

11. The non-transitory computer readable storage medium of claim 9, wherein the audio counter value increments for each consecutive audio packet, and wherein the video counter value increments for each consecutive video packet.

12. The non-transitory computer readable storage medium of claim 9, wherein the audio counter value is included in an audio packet header, and wherein the video counter value is included in a video packet header.

13. The non-transitory computer readable storage medium of claim 9, wherein the operations include:
determining the audio counter value based on the video counter value and a ratio of video packets to audio packets in the IP television program signal.

14. The non-transitory computer readable storage medium of claim 9, wherein the operations include:
when the absolute value of any of the first synchronization offset, the second synchronization offset, and the third synchronization offset exceeds the predetermined threshold, generating a network synchronization alarm for an identified IP television network node.

15. The non-transitory computer readable storage medium of claim 14, wherein the network synchronization alarm includes an IP television network diagnostic request for the identified IP television network node.

* * * * *